Sept. 28, 1965   A. W. KINGSBURY   3,208,934
LIQUID TREATING METHOD
Filed April 11, 1962   2 Sheets-Sheet 1

ALBERT W. KINGSBURY
INVENTOR.

United States Patent Office 3,208,934
Patented Sept. 28, 1965

3,208,934
LIQUID TREATING METHOD

Albert W. Kingsbury, Moorestown, N.J., assignor to Pfaudler Permutit, Inc., Paramus, N.J., a corporation of New York
Filed Apr. 11, 1962, Ser. No. 186,711
3 Claims. (Cl. 210—33)

This invention relates to a liquid treating method and comprises a measuring tank for accurately measuring a predetermined quantity of granular liquid treating material, means for transferring to said tank said predetermined quantity of granular liquid treating material, means for draining liquid from said tank without loss of granular liquid treating material, optional means for regenerating said liquid treating material in said tank, and means for discharging said predetermined quantity of granular liquid treating material from said tank.

It is an object of this invention to provide a liquid treating method to accurately measure predetermined quantities of granular liquid treating material discharging from or entering into a vessel such as an ion exchange unit. It is a further object of this invention to provide a liquid treating method in which liquid may be treated in a vessel continuously without interruption for regenerating or reconditioning. Another object of this invention is to provide a liquid treating apparatus having a treatment or storage vessel and a measuring tank with means for transferring periodically a predetermined quantity of liquid treatment material from said treatment or storage vessel to said measuring tank.

The manner in which the foregoing objects are achieved is shown in the appended drawings in which.

Figures 1, 2:
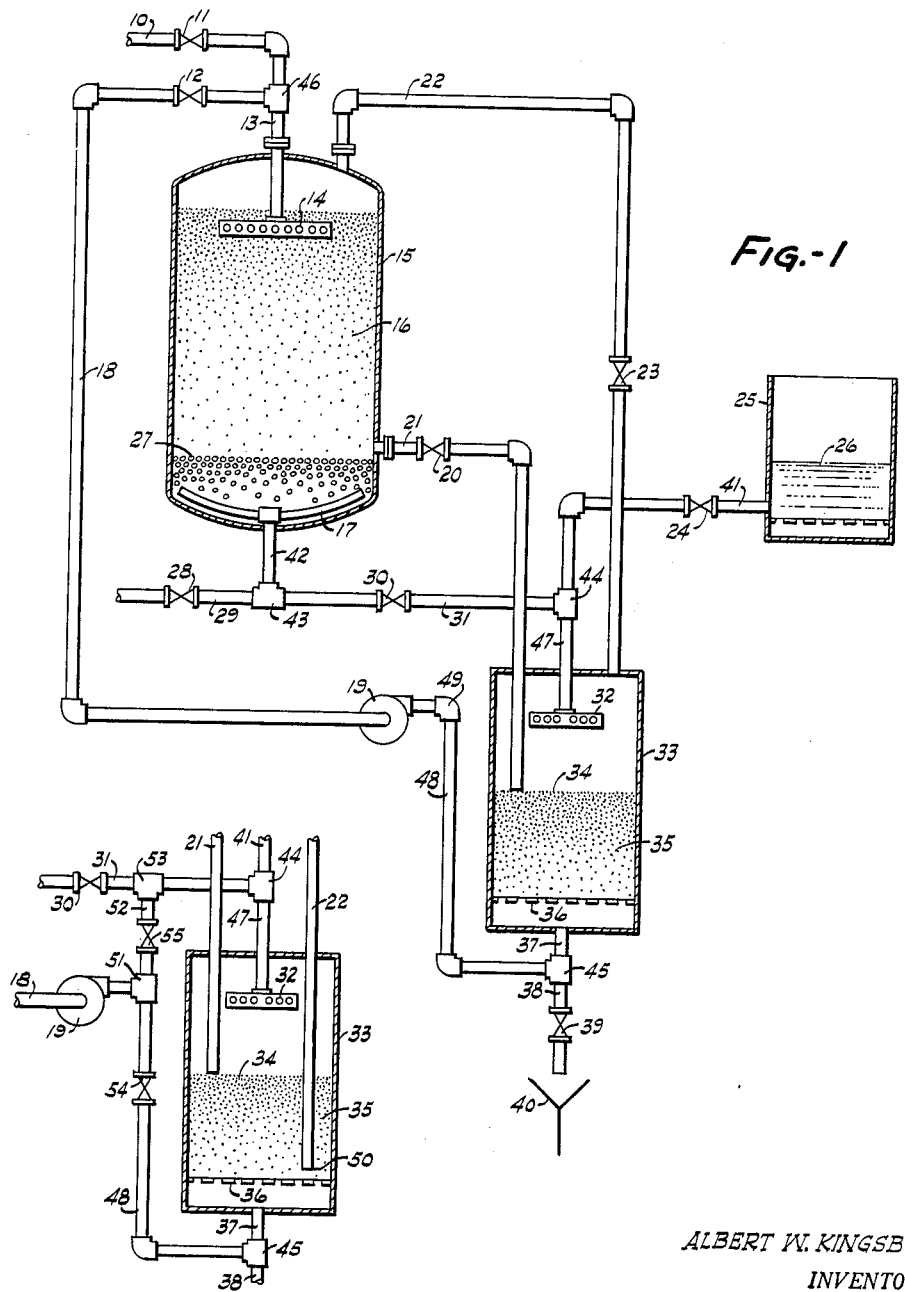
FIGURE 1 is a diagrammatic view of an apparatus according to my invention.
FIGURE 2 is a view of a modified portion of the apparatus shown in FIGURE 1.

Referring now to FIGURE 1, there is shown an ion exchange vessel 15 containing a screened collector 14 and a body of cation exchanger 16. Located in the bottom of said ion exchange vessel 15 is an underdrain consisting of a distributor 17 embedded in a gravel subfill 27. Communicating with the bottom of the ion exchange vessel 15 is a pipe 42 connected by a T 43 to a hard water inlet pipe 29 provided with a valve 28, and to a line 31 provided with a valve 30. The collector 14 is connected to a pipe 13 extending through the top of the ion exchange vessel 15 and connected by a T 46 to a treated water outlet line 10 provided with a valve 11, and to a transfer inlet line 18 provided with a valve 12 and leading to a pump 19. Extending from the side of the ion exchange vessel 15, at a level adjacent to but above the gravel subfill 27 is a discharge tube 21 provided with a valve 20 and extending and opening downwardly into a closed measuring or receiving tank 33 to a level 34 as required to measure a predetermined quantity of cation exchanger 35. A transfer outlet line 22, provided with a valve 23, interconnects the top of the ion exchange vessel 15 and the top of the measuring tank 33. The measuring tank 33 is located at a lower elevation than the ion exchange vessel 15 to permit gravity flow of ion exchanger from vessel 15 to tank 33. An underdrain consisting of a screen support 36 with holes small enough to prevent loss of the cation exchange material 35 is located near the bottom of the measuring tank 33, and extends over its entire cross-sectional area. A pipe 37 leads from the bottom of the measuring tank 33 through a T 45 to a drain line 38. A pipe 48 provided with an elbow 49 connects the outlet of pump 19 with the T 45 and thus constitutes a continuation of the transfer inlet line 18. The drain line 38 is provided with a valve 39 and leads to a sump 40. The line 31 is further connected by a T 44 to a pipe 47 and to a brine line 41, provided with a valve 24. The pipe 47 enters the top of the measuring tank 33 where it is connected to a distributor 32. The brine line 41 is further connected to a brine container 25 which holds a quantity of saturated brine 26.

In operation, initially all valves with the exception of valves 28 and 11 are closed and the pump 19 is stopped. Hard water flows through valve 28 and hard water inlet line 29, and enters the ion exchange vessel 15 through pipe 42 and the distributor 17. The hard water then flows upwardly through the body of cation exchanger 16, where it is softened by ion exchange, and is collected by the collector 14 and discharged through the pipe 13, valve 11, and the treated water outlet line 10 to a point of use. The exchange capacity of the body of cation exchanger 16 is being exhausted as water passes through it, and the exchanger must be regenerated periodically. Because the water being treated flows upwardly through the ion exchange vessel 15, the bottom portion of the body of cation exchanger 16 becomes exhausted first, and therefore, is in need of regeneration before the upper portions. For regeneration, an exhausted portion of cation exchanger from the lower part of the body 16 is withdrawn from the ion exchange vessel 15 without interrupting the treatment of water in vessel 15 which is carried on with the remaining portion of the body 16. In order to initiate the withdrawal of cation exchanger from the body 16, valves 20 and 39 are opened. Now a slurry of cation exchanger from the body 16 flows by gravity through the discharge tube 21 and open valve 20 into the measuring tank 33, open valve 39 permitting water to drain through the screen support 36 and out through the drain line 38 into sump 40. Draining of the measuring tank 33 during this operation aids in settling the cation exchanger in the measuring tank 33. When the top of the cation exchanger settling in the measuring tank 33 has reached the level 34 even with the end of the discharge tube 21, the flow of cation exchanger slurry automatically stops because the settled cation exchanger blocks the opening of the discharge tube 21 so that the settled cation exchanger will not rise higher than the level 34. The level 34 accordingly defines in the measuring or receiving tank 33 a lower measuring space and an upper free and unobstructed rising space. Thus, a constant and predetermined quantity of cation exchanger 35 is measured out in the measuring tank 33, equal in volume to that of the measuring tank 33 as measured from the top of the screen support 36 to the level 34.

Next, valve 20 is closed and valves 24 and 30 are opened, permitting saturated brine 26, entering through pipe 41, and dilution water entering through line 31 to mix in T 44, producing the dilute brine solution required to regenerate the cation exchanger. This dilute brine solution enters tank 33 through pipe 47 and distributor 32, and then passes down through the body of measured cation exchanger 35, regenerating it, and finally flows through distributor 36, pipe 37, and drain line 38 into the sump 40. When the required quantity of brine has been introduced in this manner, valve 24 is closed, shutting off the supply of saturated brine. Hard water is permitted to continue to flow through valve 30 and the line 31 into the T 44, thence continuing along the same path previously taken by dilute brine. This rinse operation is continued until the body of the cation exchanger 35 has been rinsed substantially free of spent and excess brine. Then the hard water rinse is followed by a soft water rinse. To this end valve 30 is closed and valve 23 opened, allowing soft water from the vessel 15 to flow into the top of the measuring tank 33 to displace through the cation exchanger 35 the hard water remaining in the tank 33 above the level 34 at the end of the previous rinse step. As this hard water enters the cation exchanger 35 it becomes softened by ion exchange. When this has been accomplished the soft water rinse is terminated and the transfer of ion exchanger is initiated. For this purpose valve 39 is closed, the pump 19 is started, and valve 12 is opened (valve 23 remaining open). The pump 19 now circulates soft water at a high rate of flow from vessel 15 through collector 14, pipe 13, T 46, transfer inlet line 18, pipe 48, T 45, pipe 37, upwardly through the tank 33, through valve 23, and transfer outlet line 22 back into vessel 15. The high rate of flow of water carries the body of regenerated and rinsed cation exchanger 35 out of the measuring tank 33 and through the transfer outlet line 22 into the top of the ion exchange vessel 15, depositing it on top of the body 16. When this is completed the pump 19 is stopped, and valves 12 and 23 are closed.

Softening of water now continues with all the cation exchanger in the body 16. This goes on until the lower portion of the body 16, at least equal in volume to the quantity 35, has again become exhausted, when the above described cycle of operations is repeated.

The provision of the measuring tank 33 in accordance with my invention makes it possible to accurately measure out uniform and predetermined quantities of cation exchanger. Furthermore, softening of water in a single unit continues indefinitely without interruption for purposes of regeneration. The cation exchanger is moved with a minimum of attrition, not being required to pass through a pump. The use of soft water to return the cation exchanger to vessel 15 avoids any contamination of the effluent from vessel 15 during such return, and due to the recirculation of this soft water this is accomplished without any waste of soft water.

In FIGURE 2, the apparatus of FIGURE 1 is modified as follows. The transfer outlet line 22 is extended to a level in the measuring tank 33 adjacent to and above the screen support 36, as indicated at 50. The elbow 49 is replaced by a T 51 connected by a pipe 52 with a T 53 inserted in line 31. A valve 54 is provided in pipe 48, and a valve 55 in pipe 52.

The operation of the modification shown in FIGURE 2 differs from that described above in connection with FIGURE 1 in the following respects. In the soft water rinse step valve 23 remains closed, but valve 55 is opened so that the rinse water enters the measuring tank 33 via the transfer line 18, pump 19, T 51, pipe 52 with valve 55, T 53, part of pipe 31, T 44, pipe 47 and distributor 32 (instead of through line 22). Thence the rinse water follows the same path as in FIGURE 1. In the next following transfer step valve 39 is closed. Valve 55 remains open, and valves 23 and 54 are also opened. The soft water discharged by pump 19 thus is divided in T 51 into two separate streams, a smaller portion entering tank 33 through pipe 48, T 45, and pipe 37, fluidizing the exchanger 35, and a larger portion entering tank 33 through pipe 52, T 53, part of pipe 31, T 44, pipe 47 and distributor 32, pushing the exchanger 35 down toward the end of the transfer outlet line at 50. The fluidized resin and water pass through line 22 into the top of the ion exchange vessel, as in FIGURE 1.

The arrangement of FIGURE 2 is advantageous particularly for relatively large equipment because there is less tendency for exchanger particles to linger in tank 33 at the end of the transfer step than there is in the arrangement shown in FIGURE 1.

Regeneration and rinsing of the liquid treating material in the measuring tank is an attractive but not necessary feature of my invention. If desired, the measuring tank may be used for the sole purpose of accurately measuring a predetermined quantity of granular liquid treating material which is then transferred elsewhere through the transfer outlet line for further use or processing. Such an arrangement is shown in FIGURE 3.

Figure 3:
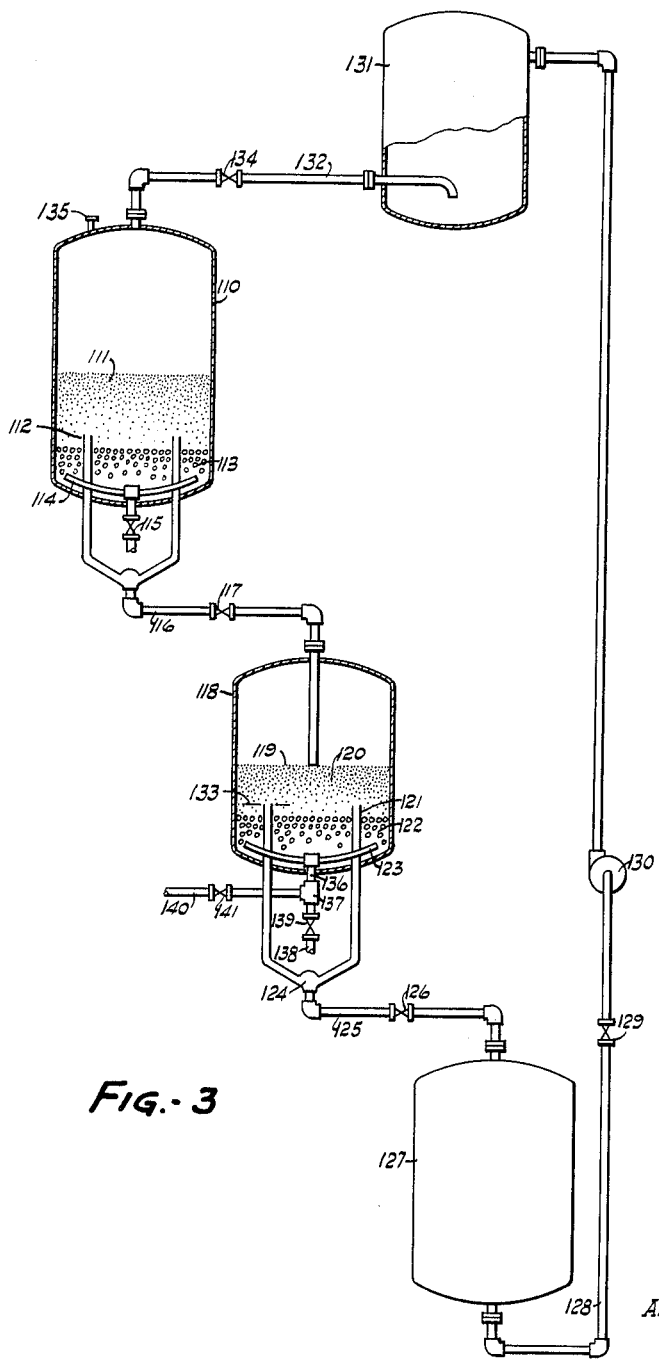
FIGURE 3 is a diagrammatic view of another embodiment of my invention.

Referring now to FIGURE 3, there is shown by way of example a reactor 127, a regenerator 131, a storage tank or vessel 110, and a measuring tank 118. The reactor 127 and the regenerator 131 are provided with the usual connections for liquid to be treated and for regeneration liquids, respectively (not shown). A pipe 128, provided with a valve 129 and a pump 130 is connected to and extends from the reactor 127 to the regenerator 131. A pipe 132 provided with a valve 134 is connected to and extends from the regenerator 131 to the storage tank 110. The storage tank 110 contains liquid and a body of regenerated granular liquid treating material 111, and is provided with an air vent 135, and an underdrain comprising a distributor 114 imbedded in a gravel subfill 113 and connected with a valved drain 115. At the bottom of the storage tank 110, and extending upwardly into said storage tank 110 to a level adjacent to and above the gravel subfill 113 is a plurality of outlets 112. These outlets 112 are connected to a common pipe 116, provided with a valve 117. At the bottom of the measuring tank 118 is an underdrain consisting of a collector 123 imbedded in a gravel subfill 122 and connected with a pipe 136 leading to a T 137 which in turn is connected with a drain pipe 138 provided with a valve 139 and a supply line 140 provided with a valve 141. At the bottom of said measuring tank 118 and extending upwardly to a level 133 adjacent to and above the top of the gravel subfill 122 is a plurality of outlets which are connected by a fitting 124 to a pipe 125 provided with a valve 126 and connected to the top of the reactor 127. The pipe 116 extends and opens downward into the measuring tank 118 to a level 119 between the top of the gravel subfill 122 and the top of the measuring tank 118. The measuring tank 118 is adapted to measure out a predetermined quantity of liquid treating material 120 having a volume equal to that of tank 118 between the levels 133 and 119.

In operation of the apparatus shown in FIGURE 3, when a substantial portion of the liquid treating material in the reactor 127 has been exhausted it is transferred as a slurry to the regenerator 131 by opening valve 29 and operating pump 130. In the regenerator 131 the liquid treating material is regenerated and rinsed in a conventional manner and then allowed to flow by gravity in the form of a slurry into the storage tank 110 where it is added to and comes to rest on top of the body of regenerated liquid treating material 111.

Periodically, a predetermined quantity of liquid treating material is transferred from the storage tank 110 through the measuring tank 118 to the reactor 127. This is accomplished in the following manner. First, valves 117 and 139 are opened. The liquid treating material now flows as a slurry by gravity through outlets 112 and pipe 116 into the measuring tank 118 where it settles on the gravel subfill 122, the excess liquid draining off through collector 123 and pipes 136 and 138. As soon as the settled liquid treating material has reached the level 119 its flow stops automatically because the settled liquid treating material blocks the opening in pipe 116 so that the liquid treating material flowing as a slurry will not rise above the level 119 at which the opening of pipe 116 is located. Thus, in each such transfer operation, the measuring tank 118 is filled with liquid treating material up to the same level 119 predetermined by the location of the end of the pipe 116.

After the liquid treating material 120 in the measuring tank 118 has thus reached the level 119, valves 117 and 139 are closed and valves 126 and 141 are opened. Liquid from a suitable source now flows through pipes 140 and 136 into the collector 123 and then upwardly through the gravel subfill 122 into the settled liquid treating material 120. The entering liquid stirs up the lower portion of the material 120 and transforms it into a free flowing slurry which passes through outlets 121, fitting 124 and pipe 125 into the reactor 127. This flow of slurry stops automatically when all liquid treating material above the level 133 has been removed from the measuring tank 118. Then valves 126 and 141 are closed.

In this manner a uniform quantity of liquid treating material 120, predetermined by the location of levels 119 and 133, has been transformed from the storage tank 110 to the reactor 127 and such transfer operation is repeated periodically as required.

While I have shown and described several embodiments of my invention as applied to specific types of liquid treating plants, this has been done merely by way of example and not for purposes of limitation. My invention may, of course, also be used for other types of treatment of water and for treatment of other liquids employing a granular liquid treating material which requires periodic regeneration or reconditioning, such as anion exchange material, activated carbon, or granular adsorbent.

Modifications other than those described may be made without departing from the spirit of my invention, and reference is, therefore, made to the following claims for a definition of the scope of my invention.

What I claim is:

1. A method of treating liquid by contact with granular liquid treating material, including the measuring out of successive batches of liquid treating material of equal volume which comprises (a) maintaining a storage zone containing a body of liquid treating material and a receiving zone, maintaining in said receiving zone below a predetermined level therein a measuring space of predetermined volume substantially smaller than the volume of said storage zone, and above said predetermined level therein a free and unobstructed rising space, (b) flowing liquid to said storage zone, establishing a flow of fluid slurry consisting of liquid and a batch of granular liquid treating material from said body from said storage zone to said receiving zone by way of a downwardly opening pipe in said receiving zone, the opening in said pipe being disposed at said predetermined level, settling said granular liquid treating material of said slurry in said measuring space while simultaneously draining excess liquid contained in said fluid slurry from the lower portion of said measuring space, flowing fluid slurry until said settled slurry has filled said measuring space, reached said predetermined level and automatically stopped further flow of fluid slurry by blocking said pipe opening, recycling settled slurry to said storage zone upon treatment of said slurry, and (c) repeating the steps listed under (b) hereof with fluid slurry consisting of liquid and another batch of liquid treating material from said body.

2. In the method of claim 1, maintaining a reaction zone, transferring said settled slurry removed from the measuring space to said reaction zone, and further transferring said settled slurry from said reaction zone to the top of the body of liquid treating material in the storage zone.

3. In the method of claim 1, carrying out reactions between liquid and the body of liquid treating material in the storage zone simultaneously with the steps listed under (b) of claim 1.

References Cited by the Examiner

UNITED STATES PATENTS

| | | | |
|---|---|---|---|
| 1,763,783 | 6/30 | Hodkinson | 210—189 X |
| 1,770,580 | 7/30 | Neumann | 210—189 |
| 2,572,082 | 10/51 | Welsh | 210—189 X |
| 2,572,848 | 10/51 | Fitch | 210—189 X |
| 2,628,192 | 2/53 | Ziegelman | 210—189 |
| 2,851,322 | 12/57 | Higgins | 210—189 X |

REUBEN FRIEDMAN, *Primary Examiner.*

HERBERT L. MARTIN, *Examiner.*